UNITED STATES PATENT OFFICE.

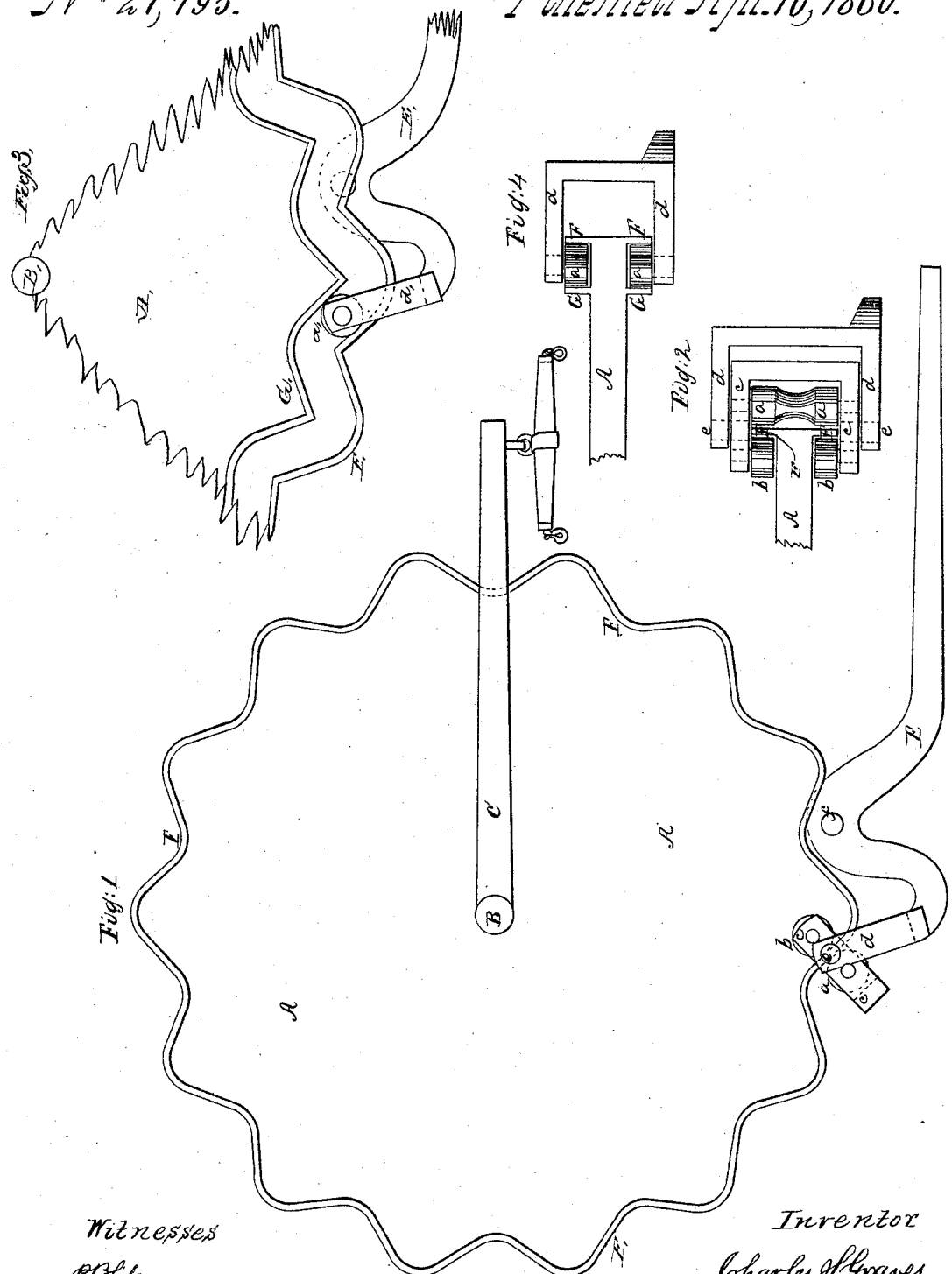

CHARLES S. GRAVES, OF ELYRIA, OHIO.

HORSE-POWER.

Specification of Letters Patent No. 27,795, dated April 10, 1860.

*To all whom it may concern:*

Be it known that I, CHARLES S. GRAVES, of Elyria, in the county of Lorain and State of Ohio, have invented a new and Improved Mode of Using Horse-Power; and I do hereby declare that the following is a full and exact description thereof, reference being had to the accompanying drawings and to the letters of reference marked thereon.

The nature of my invention consists in providing upon the wheel that communicates the power and motion a corrugated rim or edge, also a combination of friction rollers connected with the vibrating lever, which rim by means of said rollers is brought in immediate connection with the end of said lever, thus dispensing with gearing and intermediate mechanism that always causes friction and loss of power.

To enable others skilled in the art to make and use my invention I will proceed to describe its construction and operation.

I construct a horizontal wheel (Plate 1, letter A) diameter from six to ten feet more or less, resting upon a pivot or shoulder of the axis B to which is attached a horizontal arm or lever C projecting far enough beyond the wheel to attach a horse or horses. Upon the edge of the wheel I place a regular notched or corrugated rim of even thickness, flanging over each side so far that the rollers hereafter mentioned may run upon the inside of the flanges. The notches or corrugations thus made in the wheel should be circular smooth and uniform and their number and depth may vary to suit the number and length of the vibrations sought in each revolution of the wheel. I connect the lever to be vibrated E with the wheel by means of a double set of friction rollers as seen in Plate 1 or where there is a corresponding projection inside the rim by a single set as in Plate 3. The long double roller (*a a* Plates 1 and 2) rolls on the periphery of the wheel as it revolves and the two short rollers (*b b*, same plate) roll upon the inside of the flanges directly opposite the long one and are connected with it by the frame or collar *c c* (same plate). This frame is held in the fork of the lever (*d d*, same plate) by pin *e* upon which it so turns that the rollers shall at all times be directly opposite each other as they roll in and out on the corrugations of the wheels and thereby cause the vibrations of the lever E (same plate) upon its pivot *f*. The distance of this pivot from the center of the wheel should be the same as that of a pivot half way between the inner and outer pivot of the corrugations.

The lever E may be attached to a cross cut saw or by a connecting rod to the crank of a wheel. In driving a wheel more steadiness of motion may be obtained by using two levers, each connected with the main wheel by its friction rollers and each connected with the wheel to be driven by a crank or cranks with arms at right angles with each other. This main wheel may lie near the ground with lever to which the horse is attached projecting above the rim, or it may be raised and turned by a lever connected with the shaft supporting it. In stationary power the latter would be generally advisable.

Plate 1 shows the horizontal wheel A A with rim F F F arm C to which power is hitched, pivot B, lever E to which the motion is communicated, friction rollers *a* and *b* rolling outside and inside the rim F, collar or frame *c c* holding the rollers, fork of the lever *d*, pin *e* upon which the collar turns, and pivot *f* upon which the lever E vibrates.

Plate 2 shows a section view of part of the wheel A, with the projecting rim F F, the friction rollers *a a* and *b b*, frame or collar *c c*, and fork of lever *d d*.

Plate 3 shows part of wheel A, with pivot B, corrugated rim F, projecting inside of rim G to correspond with vibrating lever E, fork *d* and single roller *a*.

Plate 4 shows section view of part of wheel A as drawn in Plate 3, with projecting rim F F, with corresponding projection G G inside of rim, fork of lever *d d*, and friction rollers *a a* on both sides of wheel.

In the corrugations of the rim and corresponding projection of the wheel as made according to Plate 3 it is not necessary that the inner and outer angles of the rim and projection should be both circular as in rim of the wheel made according to Plate 1, but they may be alternately sharp as the roller presses upon the opposite side of the groove made by such rim and projection.

In the drawing, the scale of the wheel is much smaller than that of the notches upon its edge, while the scale of the friction rollers is some larger.

The advantage of my invention consists in economizing power by dispensing with intermediate gearing and machinery with its friction and loss of power.

What I claim as my invention and desire to secure by Letters Patent, is—

The combination of the lever to be vibrated with the scalloped or corrugated edge of the driving wheel substantially as above set forth.

CHARLES S. GRAVES.

Witnesses:
A. A. BLISS,
V. R. TUTTLE.